US012645962B2

(12) United States Patent
Raz et al.

(10) Patent No.: US 12,645,962 B2
(45) Date of Patent: Jun. 2, 2026

(54) GENERATING DATA SLICE RULES FOR DATA GENERATION

(71) Applicant: International Business Machines Corporation, Armonk, NY (US)

(72) Inventors: Orna Raz, Haifa (IL); George Kour, Tel Aviv (IL); Ramasuri Narayanam, Andhra Pradesh (IN); Samuel Solomon Ackerman, Haifa (IL); Marcel Zalmanovici, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 17/682,635

(22) Filed: Feb. 28, 2022

(65) Prior Publication Data

US 2023/0274169 A1 Aug. 31, 2023

(51) Int. Cl.
| | |
|---|---|
| *G06N 5/04* | (2023.01) |
| *G06F 17/18* | (2006.01) |
| *G06N 5/047* | (2023.01) |

(52) U.S. Cl.
CPC ............. *G06N 5/047* (2013.01); *G06F 17/18* (2013.01)

(58) Field of Classification Search
CPC ................................ G06N 5/047; G06F 17/18
See application file for complete search history.

(56) References Cited

U.S. PATENT DOCUMENTS

2020/0387753 A1* 12/2020 Brill ....................... G06N 20/20

OTHER PUBLICATIONS

Chung, "Automated Data Slicing for Model Validation:A Big data—AI Integration Approach", 2019 (Year: 2019).*
Ackerman, "Density-based interpretable hypercube region partitioning for mixed numeric and categorical data" (Year: 2021).*
Weir, "Sliceplorer: 1D slices for multi-dimensional continuous functions" (Year: 2017).*
Abdalla, Ali, "Increase model performance by . . . removing data?", Published In: towards data science, Nov. 29, 2019, 7 pages.
Das et al., "Finding High-Value Training Data Subset through Differentiable Convex Programming", arXiv, Apr. 28, 2021, 17 pages.
Gao et al., "Automated Testing for Deep Learning Systems with Differential Behavior Criteria", arXiv, Dec. 31, 2019, 8 pages.
Mell et al., "The NIST Definition of Cloud Computing", National Institute of Standards and Technology, U.S. Department of Commerce, Special Publication 800-145, Sep. 2011, 7 pages.
Wu et al., "Deep Validation: Toward Detecting Real-world Corner Cases for Deep Neural Networks", 2019 49th Annual EEE/IFIP International Conference on Dependable Systems and Networks (DSN), Jun. 27, 2019, 13 pages.
Zhang et al., "Machine Learning Testing: Survey, Landscapes and Horizons", arXiv, Dec. 21, 2019, 37 pages.
Ghorbani, et al., Data Shapley: Equitable Valuation of Data for Machine Learning, Apr. 5, 2019, 10 pages.
Yoon, et al., Data Valuation using Reinforcement Learning, Proceedings of the 37th International Conference on Machine Learning, 2020, vol. 119, pp. 10842-10851.

* cited by examiner

*Primary Examiner* — Van C Mang
(74) *Attorney, Agent, or Firm* — Michael O'Keefe

(57) ABSTRACT

An example system includes a processor to receive a data set. The processor can generate a data slice rule based on a data observation for a data point in the data set. The processor can generate an instance of data based on the generated data slice rule.

19 Claims, 9 Drawing Sheets

400

100A

RECEIVE DATA SET 202

GENERATE DATA SLICE RULES BASED ON DATA OBSERVATIONS FOR DATA POINTS IN DATA SET 204

GENERATE INSTANCES OF DATA BASED ON GENERATED DATA SLICE RULES 206

200

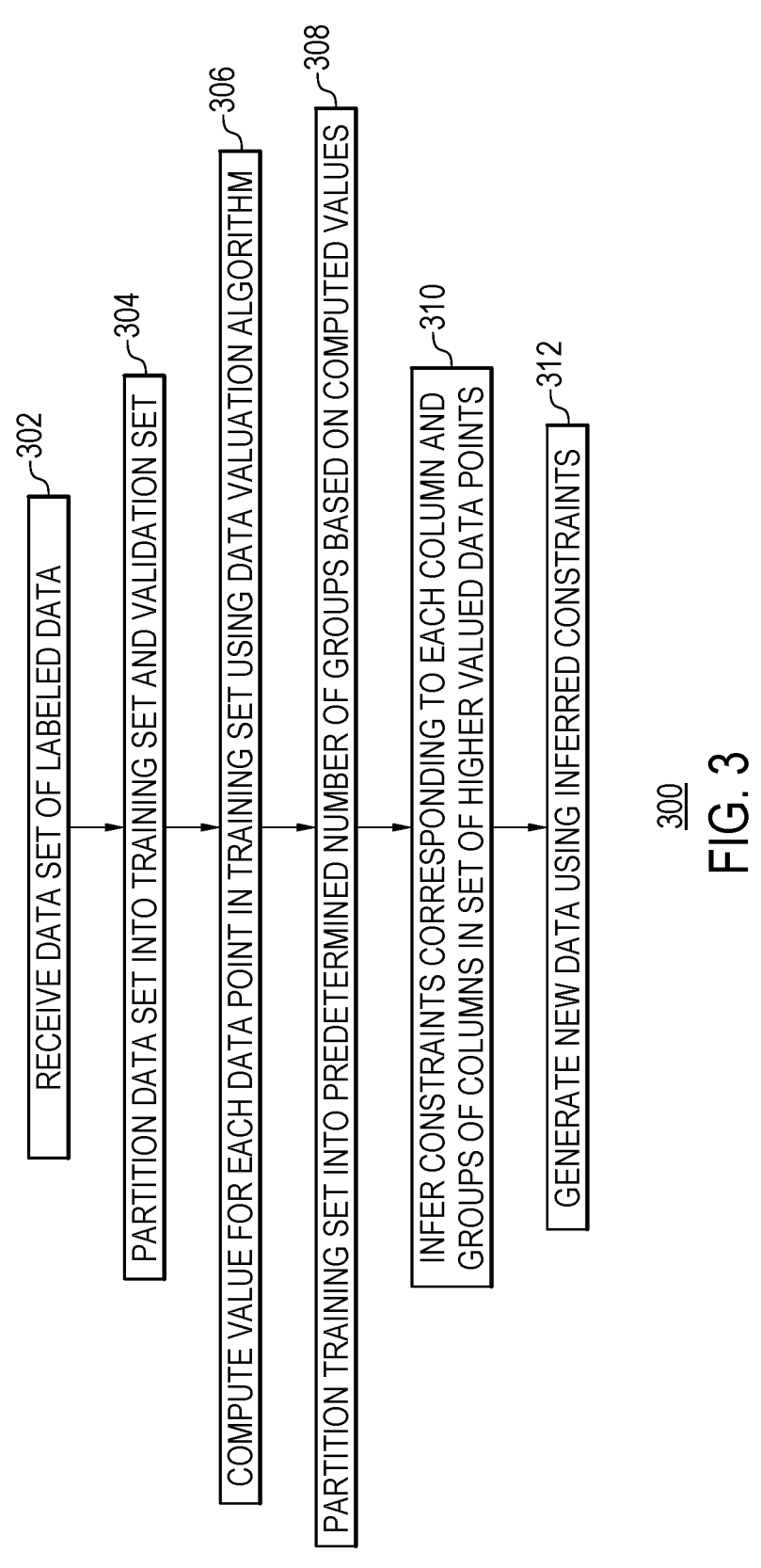

RECEIVE DATA SET OF LABELED DATA 302

PARTITION DATA SET INTO TRAINING SET AND VALIDATION SET 304

COMPUTE VALUE FOR EACH DATA POINT IN TRAINING SET USING DATA VALUATION ALGORITHM 306

PARTITION TRAINING SET INTO PREDETERMINED NUMBER OF GROUPS BASED ON COMPUTED VALUES 308

INFER CONSTRAINTS CORRESPONDING TO EACH COLUMN AND GROUPS OF COLUMNS IN SET OF HIGHER VALUED DATA POINTS 310

GENERATE NEW DATA USING INFERRED CONSTRAINTS 312

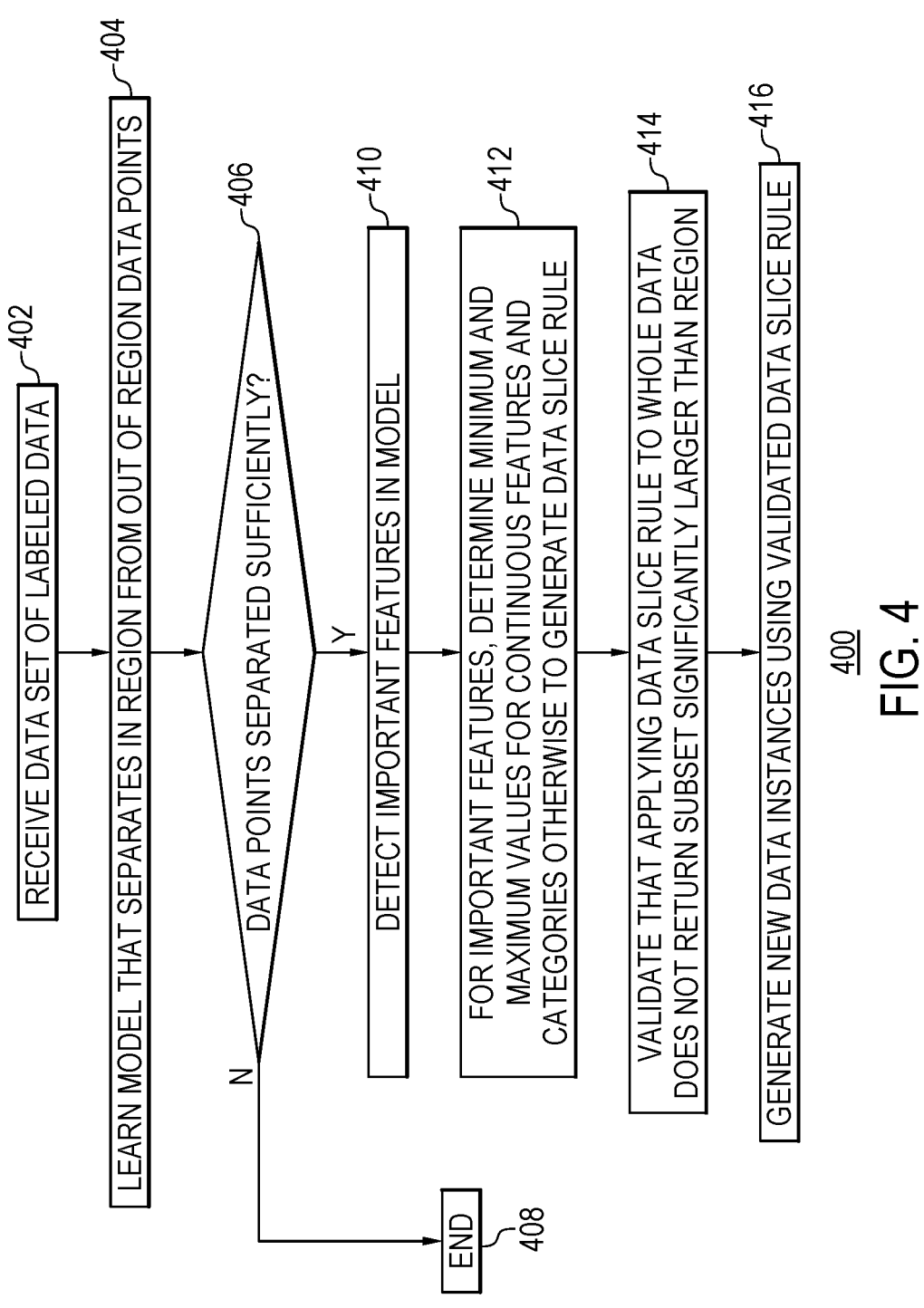

RECEIVE DATA SET OF LABELED DATA ⌐402

LEARN MODEL THAT SEPARATES IN REGION FROM OUT OF REGION DATA POINTS ⌐404

DATA POINTS SEPARATED SUFFICIENTLY? ⌐406

N → END ⌐408

Y

DETECT IMPORTANT FEATURES IN MODEL ⌐410

FOR IMPORTANT FEATURES, DETERMINE MINIMUM AND MAXIMUM VALUES FOR CONTINUOUS FEATURES AND CATEGORIES OTHERWISE TO GENERATE DATA SLICE RULE ⌐412

VALIDATE THAT APPLYING DATA SLICE RULE TO WHOLE DATA DOES NOT RETURN SUBSET SIGNIFICANTLY LARGER THAN REGION ⌐414

GENERATE NEW DATA INSTANCES USING VALIDATED DATA SLICE RULE ⌐416

Computing Device

502
Processor

506

504
Memory Device

522
Storage Device

Data Value Evaluator Module    524

Rule Generator Module    526

Data Generator Module    528

508
I/O Device Interface

510
I/O Devices

512
Display Interface

514
Display Device

NIC

516

518    Network

520
External Computing Device

GENERATING DATA SLICE RULES FOR DATA GENERATION

BACKGROUND

The present techniques relate to data generation. More specifically, the techniques relate to generating data using data slice rules.

SUMMARY

According to an embodiment described herein, a system can include processor to receive a data set. The processor can also further generate a data slice rule based on a data observation for a data point in the data set. The processor can also generate an instance of data based on the generated data slice rule.

According to another embodiment described herein, a method can include receiving, via a processor, a data set. The method can further include generating, via the processor, a data slice rule based on a data observation for a data point in the data set. The method can also further include generating, via the processor, an instance of data based on the generated data slice rule.

According to another embodiment described herein, a computer program product for generating data slice rules can include computer-readable storage medium having program code embodied therewith. The computer readable storage medium is not a transitory signal per se. The program code executable by a processor to cause the processor to receive a data set. The program code can also cause the processor to generate a data slice rule based on a data observation for a data point in the data set. The program code can also cause the processor to generate an instance of data based on the generated data slice rule.

BRIEF DESCRIPTION OF THE SEVERAL VIEWS OF THE DRAWINGS

FIG. 3 is a process flow diagram of an example method that can generate instances of data using data slice rules generalized from subsets of data points using data valuation;

FIG. 4 is a process flow diagram of an example method that can generate instances of data using data slice rules generalized from subsets of data points using feature importance;

DETAILED DESCRIPTION

Figure 1A:
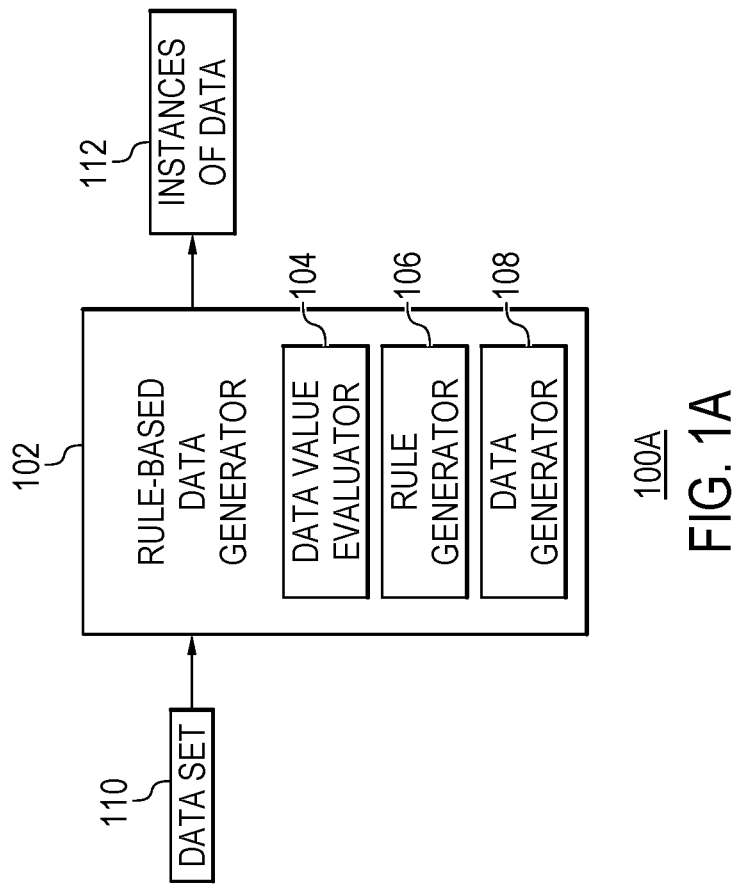
FIG. 1A is a block diagram of an example system for generating instances of high value data using data slices generated from an input data set based on data valuation.

The ability to learn from data, such as by machine learning (ML) algorithms, may heavily depend on the distribution of the available data. The quality and distribution of the training data and how well the training represents test data expected during operation is an inhibitor not only to effective training or insight gaining, but also to the ability to assess the resulting solutions, especially with regard to whether an AI model achieves its requirements. In some cases, the satisfaction of requirements may be validated using test cases that cover not only the main path of usage, but also extreme and rare cases.

Probably approximately correct (PAC) learning is an ML framework. The PAC framework guarantees that under specific conditions, a learning algorithm, when trained on enough examples, will perform adequately with a high probability on samples taken from the same underlying distribution of data as the training data. Nevertheless, when collecting data, there may be no guarantee that the collected data properly approximates the real-life underlying distribution. For example, this may be due to the difficulty of obtaining different types of samples. In some cases, the data may not approximate the real-life distribution due to a discrepancy between what the system designer expects and the real life usage. In other cases, data may not approximate the real-life distribution due to changes or drift that affect the incoming data distribution. In addition, as mentioned above, system designers may seek to assess model performance not only in high probability instances but also in low density subspaces. For example, once such low quality areas are identified, the system designers may take various corrective actions. In some cases, the designers may want to improve the solution such that it performs well even on low density subspaces. Alternatively, the designers may decide to handle incoming records that fall under certain low density subspaces outside of the AI solution. For example, the records in such low density subspaces may be handled by a human or a rule based solution.

Collecting more data to better assess the algorithm performance on real life samples may be a primary approach to improving machine learning. However, in some cases, such data collection may be very expensive. Moreover, once collected, the system designers may be tempted to use this additional data to augment the training set rather than employ the additional data for testing. Therefore, current approaches use rule based techniques based on label preserving manipulations on existing data. However, these solutions may tend to capture too little information about the data. For example, these solutions may provide generated data with similar distribution for single features without taking into account the relation to other features or capture simple relations among a small subsets of features. As one example, such solutions may only capture simple relations such as linear relations. The resulting data therefore often fails to represent real data.

These challenges may become even greater when there are few data points in some subspaces. For example, the above methods may miss these data points altogether and the resulting models may be even more prone to over fitting. Thus, this is one example of data that may be especially interesting or of high value to generate. There are additional examples of high value data. In some cases, some algorithms define such high value data, typically for specific single data records. For example, Shapley value provides a principled way to explain the predictions of nonlinear models common in the field of machine learning. By interpreting a model trained on a set of features as a value function on a coalition of players, Shapley values provide a natural way to compute which features contribute to a prediction.

According to embodiments of the present disclosure, a system includes a processor to receive a data set. The processor can generate one or more data slice rules based on at least one data observation for one or more data points in the data set. The processor can generate one or more instances of data based on the generated one or more data slice rules. In some examples, the generated instances of data may be used for testing. Thus, embodiments of the present disclosure enable directing data generation to high value data sub spaces for the purpose of automatically generating artificial intelligence (AI) testing corner cases. In this regard, the embodiments herein also define what high value subspaces are and provide several implementations. The embodiments herein also provide methods for generalizing beyond concrete single records into data slices, which are rules that can be applied on any dataset with the same features. Moreover, the embodiments described herein can handle data modalities that include both tabular data, including numeric and categorical features, as well as free text data.

With reference now to FIG. 1A, a block diagram shows an example system for generating instances of high value data using data slices generated from an input data set based on data valuation. The example system 100A of FIG. 1A includes a rule-based data generator 102. The rule-based data generator 102 includes a data value evaluator 104, a rule generator 106, and a data generator 108. The rule-based data generator 102 is shown receiving a data set 110 and generating instances of data 112. For example, the data set 110 may be of any suitable data modality, which may include both tabular data, including numeric and categorical features, as well as free text data.

In the example of FIG. 1A, the rule-based data generator 102 can receive a data set 110 and generate instances of data 112 using the generated data slices. For example, the data set 110 may include few data points in some subspaces. Thus, instances of data within such subspaces may be one example of high value data that may be especially interesting or of high value to generate. There are additional examples of high value data. In various examples, any suitable data valuation algorithm may be used to define such high value data, such as for specific single data records. For example, Shapley values may be used to explain the predictions of nonlinear models common in the field of machine learning. Shapley value may be used to compute how much each observation is contributing to the overall ability to learn of a machine learning model. By interpreting a model trained on a set of features as a value function on a coalition of players, Shapley values provide a natural way to compute which features contribute to a prediction. Other example data valuation algorithms may include reinforcement learning algorithms, leave one out algorithms. Such data valuation algorithms may be used to evaluate how important each data point is for a particular task at hand. For example, a leave one out algorithm may measure the effect of leaving a particular data point out during training on the resulting effectiveness of a model trained without the data point. In various examples, the data points may be valuated using any suitable measurement of value described herein.

In various examples, the data value evaluator 104 can partition the data set 110 into a number of predetermined groups. For example, the data points may be ranked according to their values and divided into groups. In some examples, one of the groups may be a group of high value data points. For example, the values of the high value data points may exceed a first threshold as measured using the measurement of value. The rule generator 106 can then generate a data slice rule based on the group of high value data points. For example, the data slice rule may be a data slice that describes the group of high value data points using ranges of values of one or more features. In some examples, the data value evaluator 104 can also generate groups of moderate value and low value data points. For example, the groups of moderate value data points may exceed a second lower threshold when measured using the measurement of value. In some examples, data slices may be generated using density based or error concentration based measurements of value.

In various examples, the rule-based data generator 102 can then generate instances of data 112 based on the data slice rules generated by the rule generator 106. For example, once values are attached to data samples, high value instances of instances of data 112 taken from the subspaces induced by high value samples may be generated. In various examples, different sampling techniques used may depend on the data modalities. For example, a constraint based sampling may be used in tabular data containing numeric or categorical fields. In some examples, the generation may be driven by a stochastic generative models if visual or textual data is involved. For example, for textual content, a generative model may be learned rather than use rule base manipulations on existing data generating synthetic data. These generative algorithms, when trained on enough data, are able to generate surprisingly valid samples, which may be used not only to augment the training data but also may be used to build better covering test cases for the discriminative algorithm. Thus, the generated instances of data 112 may be similar in value to the data points identified by the data value evaluator 104 as being high value. In this manner, the rule-based data generator 102 can generate instance of high value data to provide additional coverage of one or more corner cases in the data set 110. In some examples, moderate value instances of data 112 may be generated. For example, the moderate value instances of data 112 may be generated based on data slices associated with moderate value data points in the data set 110.

In some examples, the rule-based data generator 102 can generate the generated instances of data 112 using the generated data slice rule based on the data set 110. Alternatively, or in addition, in various examples, the rule-based data generator 102 can generate the instances of data 112 using the generated rule based on a different data set (not shown). For example, the rule-based data generator 102 can generate the instances of data 112 using any of the methods 200-400 of FIGS. 2-4 described below. Alternatively, or in addition, the data generator 108 can generate an initial set of data, which may be filtered based on the data slice rules from the rule generator 106 to generate the instances of data 112.

It is to be understood that the block diagram of FIG. 1A is not intended to indicate that the system 100A is to include all of the components shown in FIG. 1A. Rather, the system 100A can include fewer or additional components not illustrated in FIG. 1A (e.g., additional data sets, or additional instances of data, etc.).

Figure 1B:
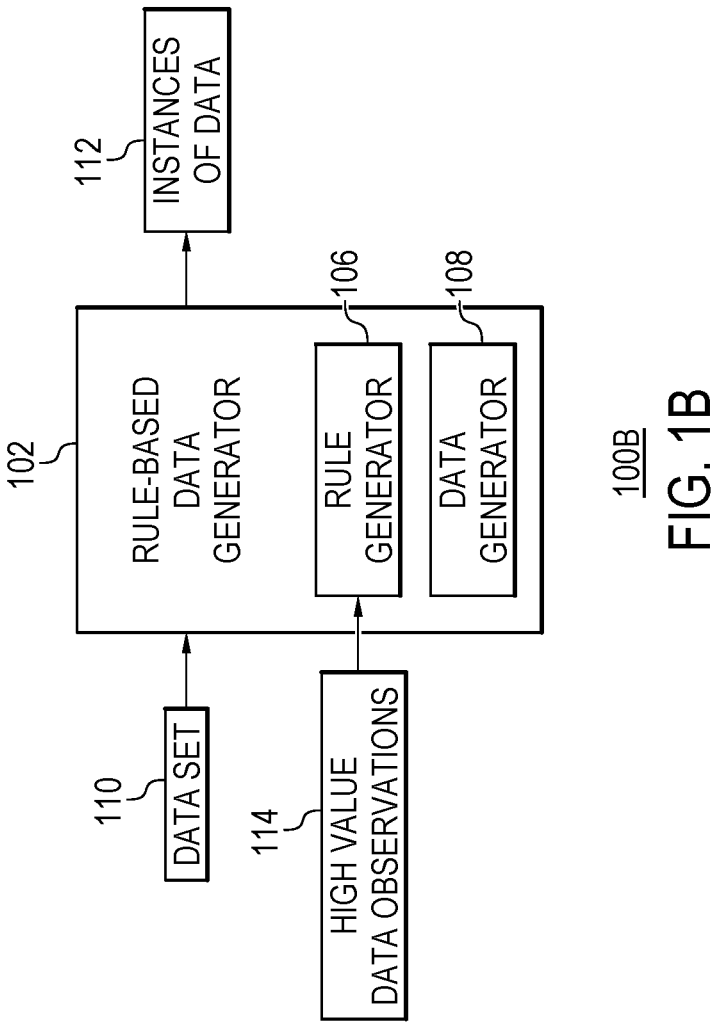
FIG. 1B is a block diagram of an example system for generating instance of high value data using data slices generated from an input data set based on provided high value data observations.

With reference now to FIG. 1B, a block diagram shows an example system for generating instance of high value data using data slices generated from an input data set based on provided high value data observations. The example system 100B of FIG. 1B includes similarly numbered elements of FIG. 1A. In addition, the rule-based data generator 102 is shown receiving a high value data observation 112 in addition to the data set 110. In particular, the rule generator 106 of the rule-based data generator 102 is shown receiving the high value data observation 112.

In the example of FIG. 1B, the rule-based data generator 102 can receive a high value data observations 112 and generate data slice rules based on the high value data observations 114 via the rule generator 106. The data generator 108 can then generate instances of data 112 based on the generated data slice rules. For example, the data slice rules can be generated using the methods 200 and 400 of FIGS. 2 and 4. Alternatively, or in addition, the data generator 108 can generate an initial set of data, which may be filtered based on the data slice rules to generate the instances of data 112.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional data sets, observations, or additional generated data, etc.).

Figure 2:
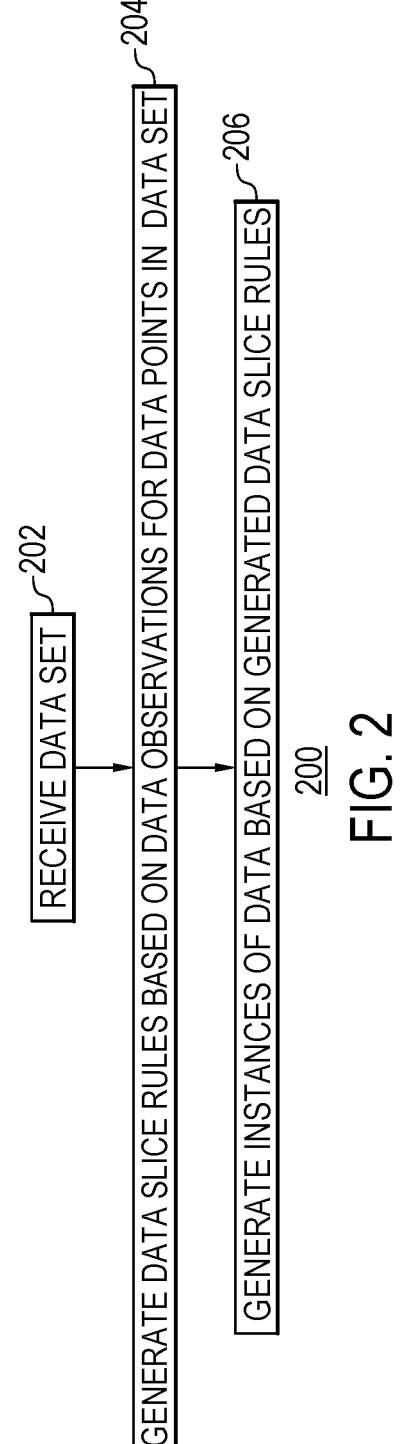
FIG. 2 is a process flow diagram of an example method that can generate data using generated data slice rules.

FIG. 2 is a process flow diagram of an example method that can generate data using generated data slice rules. The method 200 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 202, a processor receives a data set. For example, the data set may be a set of labeled data points. In some examples, the data set may be a set of data points without labels. In various examples, the processor may also receive a set of high value data observations. In various examples, the high value data observations may be density based, error concentration based, or based on data values of individual data records in the data set.

At block 204, the processor generates data slice rules based on a data observations for a data points in the data set. In some examples, the high value data observation may be generated based on valuation of data points in the data set using any suitable data valuation algorithm, as described in FIG. 3. For example, the processor can calculate values for data points in the data set using a data valuation algorithm and divide the data points into groups based on the calculated values. The processor can then infer constraints corresponding to each column and groups of columns in a group of higher valued data points. In some examples, the processor can generate the data slice rule using a measurement of importance. For example, the processor can learn a model that separates in region from out of region data points, and detect important features in the model. In some examples, the processor can validate that applying the data slice rule to the whole data set does not return a subset significantly larger than the region.

At block 206, the processor generates instances of data based on the generated data slice rules. For example, the processor can generate the instance of data based on input data points from the data set. In some examples, the processor can generate the instance of data based on data points from a second data set. For example, the second data set may include a set of data points not necessarily included in the first data set. In various examples, the instances of data may be instances of high value data. For example, the high value data may be data for which high rate of failure is expected for a particular AI model. In some examples, the instance of data may include instances of moderate value data. For example, the moderate value data may include instances of data that do not necessarily cause failure but may otherwise be interesting for analysis.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

FIG. 3 is a process flow diagram of an example method that can generate instances of data using data slice rules generalized from subsets of data points using data valuation. The method 300 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 302, a processor receives a data set of labeled data. For example, the labels may be importance values for each of the data points in the data set with respect to some criterion. For example, the criterion may be with respect to the quality of the data. In various examples, the criterion may be the criterion of difficulty to separate between data points based on their label, or a criterion of missing values for some of the features.

At block 304, the processor partitions the data set into a training set and a validation set. For example, the training set may be a partial subset of the data set and the validation set may be the remaining subset of the data set.

At block 306, the processor computes a value for each data point in the training set using a data valuation algorithm. In various examples, the data valuation algorithm may be may be the Data Shapley data valuation algorithm. In some examples, the data valuation algorithm may be a reinforcement learning algorithm, such as the Data Valuation using Reinforcement Learning (DVRL) data valuation algorithm. For example, the Data Shapley data valuation algorithm uses Monte Carlo or gradient-based methods to estimate data Shapley values in settings such as neural networks trained on large datasets. The DVRL algorithm adaptively learns data values jointly with a target task predictor model. For example, the DVRL algorithm uses a data value estimator to learn how likely each datum is used in training of the predictor model. In particular, the DVRL algorithm trains the data value estimator using a reinforcement signal of the reward obtained on a small validation set that reflects performance on the target task. In some examples, the data valuation algorithm may be a leave one out algorithm, where a score for each data point indicates how important that data point is for a target task by measuring the effect of leaving the data point out.

At block 308, the processor partitions the training dataset into a predetermined number of groups based on the computed values. For example, the processor may partition the training dataset into three clusters including a high valued data point cluster, a moderate valued data point cluster, and a low valued data point cluster. In various examples, the groups may be divided into equal sized buckets, different sized buckets, or any other suitable division.

At block 310, the processor infers constraints corresponding to each column and groups of columns in the set of higher valued data points. For example, the inferred constraints may be subsets of feature values that separates the columns and groups of columns. In various examples, each column may correspond to a set of values for a particular feature and each group of columns may be related features. The processor may thus infer constraints that provide a set of rules for how sets of values for particular features or groups of features correspond to each of the clusters or groups. As one example, a constraint may indicate that a data point having values for a particular feature within a particular range or combination with ranges of other features may belong to a particular cluster. In some examples, the processor can extract the constraints from various characteristics of an empirical distribution, such as distribution moments such as mean, variance, and extreme values. In various examples, the processor can extract constraints from the goodness of fit to known parametric distributions, and to pre-defined relations among features. For example, the pre-defined relations may include linear and polynomial relations.

At block 312, the processor generates new data using the inferred constraints. For example, the new data may be generated using any suitable data generation algorithm. In some examples, the data may be generated based on the constraints associated with the high value cluster. For example, the new data may cover valuable corner cases and may be used to train a model for such cases. In some example, the new data may be generated based on constraints associated with the moderate value cluster. For example, the new data may cover instances of interest that may not necessarily lead to model failure. In various examples, the new data may be used as high value observations that add new values to a training set based on the inferred constraints. In some examples, the new data may be generated using the data set. In various examples, the new data may be generated using another data set.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

FIG. 4 is a process flow diagram of another example method that can generate instances of data using data slice rules generalized from subsets of data points using feature importance. The method 400 can be implemented with any suitable computing device, such as the computing device 500 of FIG. 5 and is described with reference to the system 200 of FIG. 2. For example, the methods described below can be implemented by the processor 502 or the processor 802 of FIGS. 5 and 8.

At block 402, a processor receives a data set of labeled data. In various examples, the labeled data may be a set of data points with corresponding labels. For example, the labels may include the labels used for an original learning task. In some examples, the data points may also be given an indication according to whether or not each data point belongs to a high value subset, such as an indication of data points that are expected to be hard to separate according to their input label.

At block 404, the processor learns a model that separates in region points from out of region data points. For example, the processor can generate labels for each of the data points as in region or out of region. In various examples, a region may be a set of points that may be sought to be described as a data slice. Thus, the processor may solve a meta-learning problem of learning to separate in-region from our-of-region data points. In various examples, any machine learning algorithm that outputs relative importance of features as one output may be used to separate the region points from the out of region points. For example, a random forest classifier using a stratified k-fold on the data may be used to separate the region points from out of region points. In some examples, a support vector machine (SVC) based algorithm may be used to separate in region from out of region data points. In some examples, a convolutional neural network (CNN) or deep neural network (DNN) may be used to separate the in region data points from out of region data points. In various examples, the processor may mark in region data points with a value of one and out of region data points with a value of zero.

At block 406, the processor determines whether the points are sufficiently separated. In various examples, the points may be sufficiently separated if the performance of a model trained on the separated data points exceed some baseline. For example, the baseline may be a random guess. Thus, if the performance of the model exceeds a 50% chance of assigning data points to a particular in region or out region, then the points may be sufficiently separated. In some examples, the processor can use a receiver operating characteristic (ROC) curve to determine whether the points are sufficiently separated. In some examples, the ROC curve may be used to determine a best separation of multiple separations. In various examples, any measure that takes into account label imbalance may be used to determine whether the points are sufficiently separated. For example, an F1-score may be used to determine whether the points are sufficiently separated. In various examples, if the data points are not able to be sufficiently separated after a few attempts using different algorithms at block 404, then the method may proceed at block 408. If the data points are sufficiently separated, then the method may continue at block 410.

At block 408, the method ends. For example, generate a rule describing a slice for a particular set of points may not always be possible. In such cases, the method may end after a predetermined number of attempts using different separation algorithms at block 404.

At block 410, the processor detects a set of most important features in the model. In some examples, using random forest classifier, the processor can determine the most important feature based on the output of the random forest classifier. For example, the importance of each feature may be one of the outputs of the random forest classifier. In various examples, the permutation feature importance algorithm may be used to find the most important feature. For example, the permutation feature importance algorithm may randomly shuffle a single feature value and measure the decrease in a model score in response to the random shuffle.

At block 412, for the most important features, the processor determines minimum and maximum values for continuous features and categories otherwise to generate a data slice rule. For example, the data slice rule may be in a CNF-like form. In various examples, the most important features may be ranked by importance. The processor can select a number of most important features to generate the data slice rule. For example, the processor may select the top three, four, or five most important features and generates the data slice rule based on the selected features.

At block 414, the processor validates that applying rule to whole data does not return subset significantly larger than region. For example, the processor may validate that applying the rule results in coverage of all the data points in the region with few to no data points covered outside of the region.

At block 416, the processor generates new data instances using the validated data slice rule. For example, the new data instances may be generated by a data generation algorithm based on the validated data slice rule. In some examples, the data generation algorithm can generate instances that are then filtered based on the validated data slice rule.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
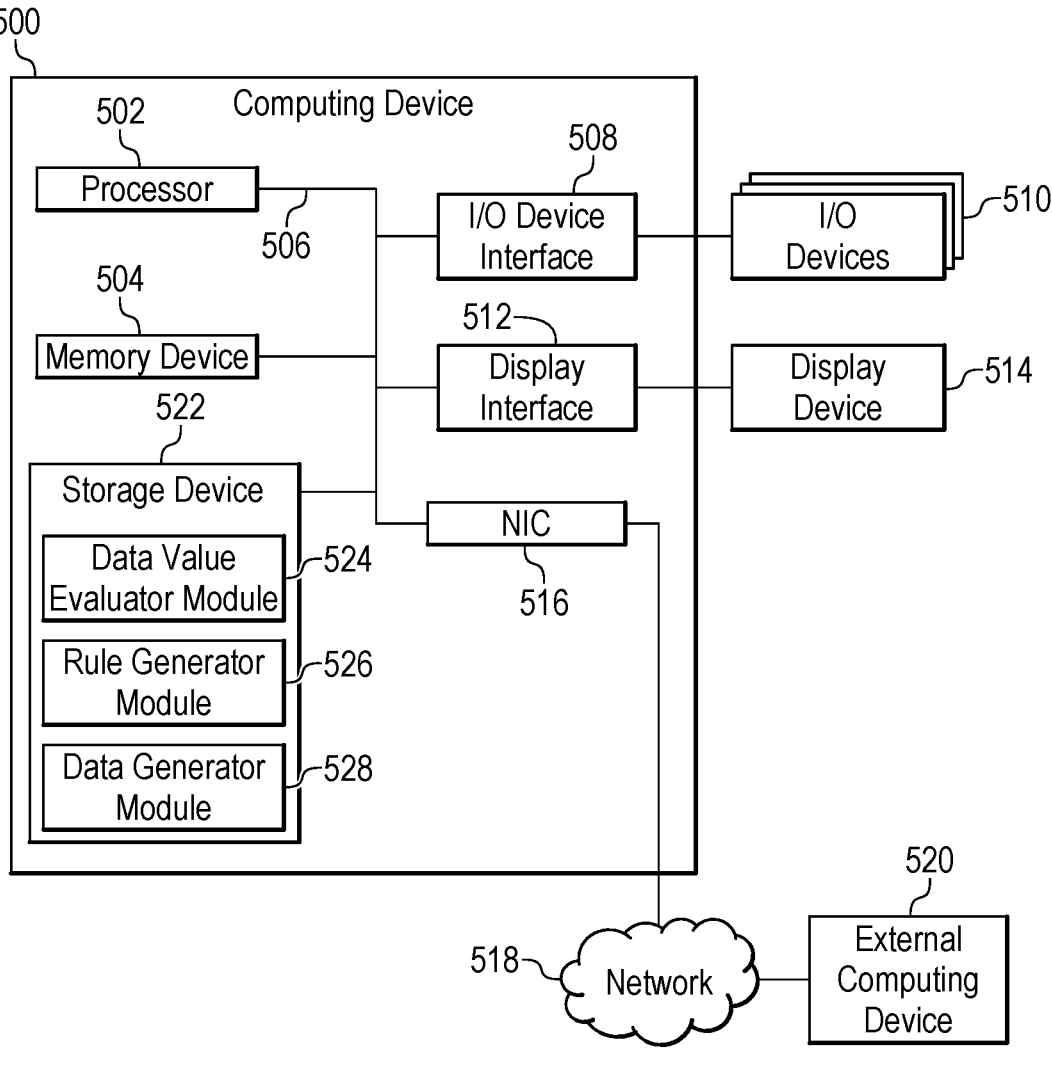
FIG. 5 is a block diagram of an example computing device that can generate data using data slices.

FIG. 5 is block diagram of an example computing device that can generate data using data slices. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external web-server 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a data value evaluator module 524, a rule generator module 526, and a data generator module 528. The data value evaluator module 524 can receive a data set. In some examples, the data value evaluator module 524 can receive a data set of labeled data points. In some examples, the data value evaluator module 524 can partition the data set into a training set and a validation set. The data value evaluator module 524 can also compute a value for each data point in training set using a data valuation algorithm. In some examples, the data value evaluator module 524 can generate a data observation for each data point in the data set. For example, the data observation may be a density based observation, an error concentration based observation, a data value based observation, or any combination thereof. In some examples, the data value evaluator module 524 calculate observations by computing a value for each data point in a training set of the data set using a data valuation algorithm. A rule generator module 526 can generate a data slice rule based on a data observation for a data point in the data set. For example, the rule generator module 526 can partition the training dataset into a predetermined number of groups based on the computed values. The rule generator module 526 can further infer constraints corresponding to each column and groups of columns in the set of higher valued data points of the training set. In some examples, the rule generator module 526 can also receive high value data observations and generate data slice rules based on the high value data observations. In various examples, the rule generator module 526 can receive moderate value data observations and generate data slice rules based on the moderate value data observations. In some examples, the rule generator module 526 can learn a model that separates in region points from out of region data points. In some examples, the rule generator module 526 can determine whether the points are sufficiently separated. In some examples, the rule generator module 526 can detect a set of more important features in the model. In various examples, the rule generator module 526 can, for the most important features in the set of more important features, take minimum and maximum values for continuous features and categories otherwise to generate a rule. A data generator module 528 can generate an instance of data based on the generated data slice rule. For example, the data generator module 528 can generate new data using inferred constraints. In various examples, the data slice rule may correspond to high value data or moderate value data, or a combination thereof.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). For example, the data observations may be received instead of generated, in which case the data value evaluator 524 may be excluded from the computing device 500. In some examples, the computing device 500 may include an AI model tester (not shown) to test an artificial intelligence model using generated instances of data. Furthermore, any of the functionalities of the data value evaluator 524, the rule generator module 526, and the data generator module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the data value evaluator module 524, the rule generator module 526, and the data generator module 528 can be implemented with logic, wherein the logic, as referred to herein, can include any suitable hardware (e.g., a processor, among others), software (e.g., an application, among others), firmware, or any suitable combination of hardware, software, and firmware.

Figure 6:
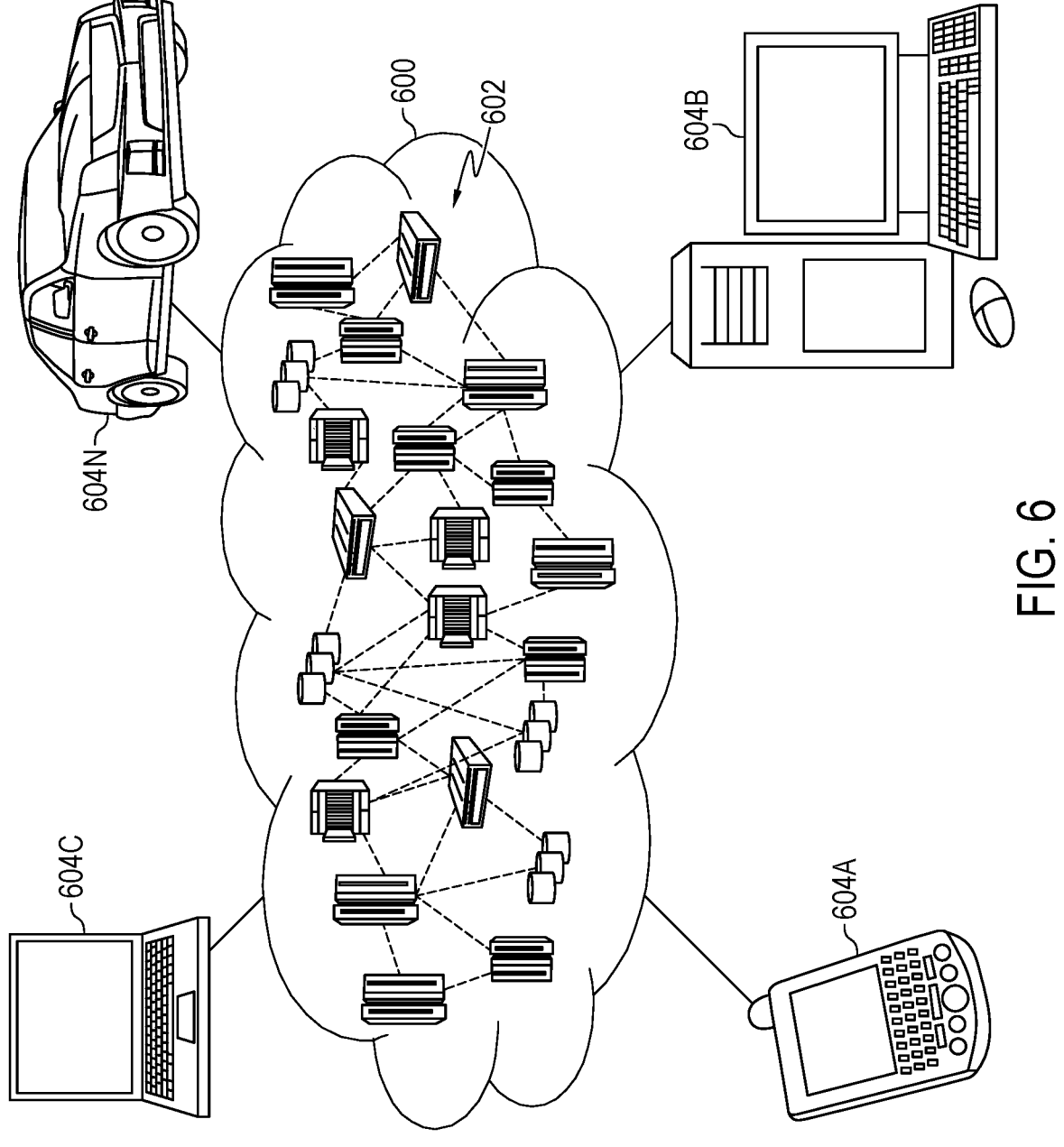
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
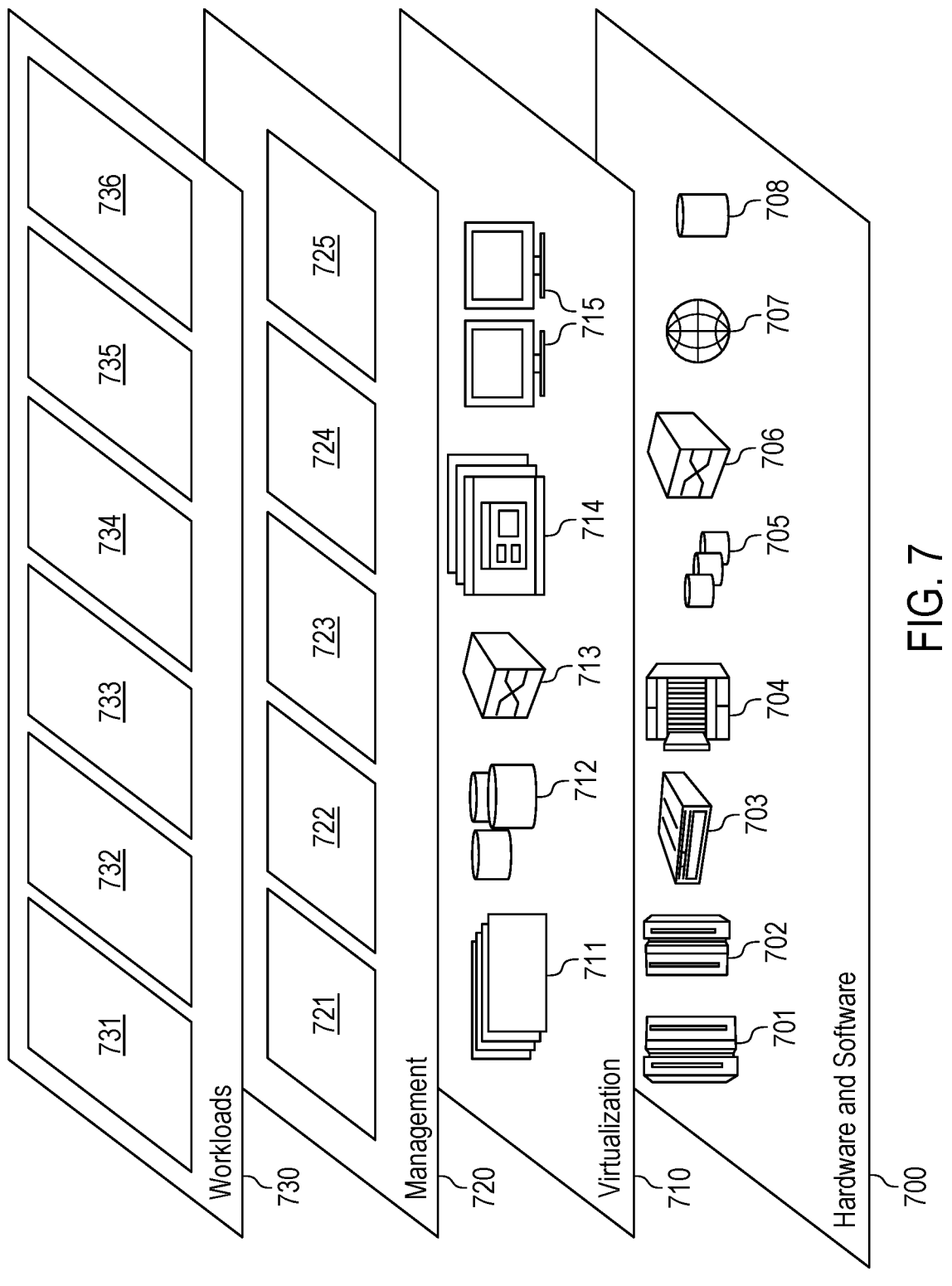
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and data slice rule generation 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
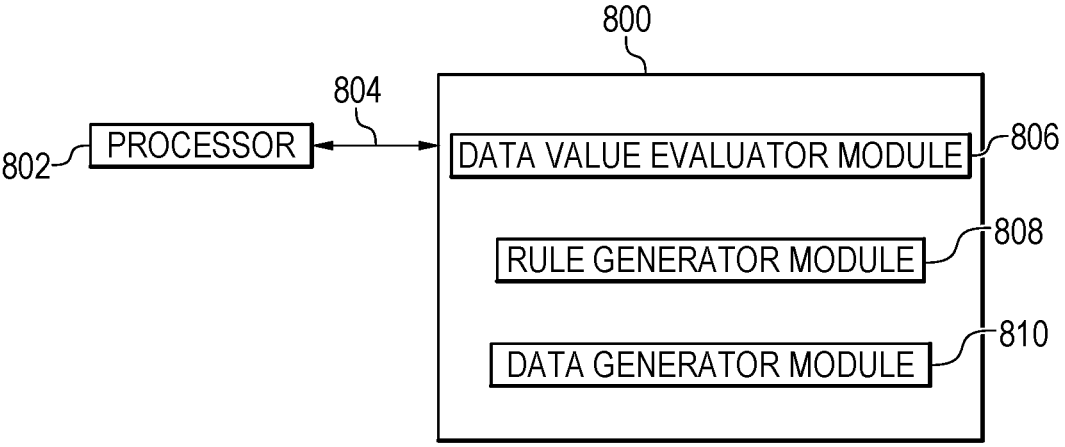
FIG. 8 is an example tangible, non-transitory computer-readable medium that can generate data using data slices.

Referring now to FIG. 8, a block diagram is depicted of an example tangible, non-transitory computer-readable medium 800 that can generate data using data slices. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 200-400 of FIGS. 2-4.

The various software components discussed herein may be stored on the tangible, non-transitory, computer-readable medium 800, as indicated in FIG. 8. For example, a data value evaluator module 806 includes code to receive a data set. In some examples, the data set may include labeled data points. In various examples, the data value evaluator module 806 can partition the data set into a training set and a validation set. The data value evaluator module 806 also includes code to compute a value for each data point in training set using data valuation algorithm. A rule generator module 808 includes code to generate a data slice rule based on a data observation for a data point in the data set. For example, the rule generator module 808 may include code to partition the training dataset into a predetermined number of groups based on the computed values. The rule generator module 808 further includes code to infer constraints corresponding to each column and groups of columns in the set of higher valued data points. For example, the rule generator module 808 further includes code to calculate values for data points in the data set using a data valuation algorithm and dividing the data points into groups based on the calculated values, and infer constraints corresponding to each column and groups of columns in a group of higher valued data points. In some examples, the rule generator module 808 also includes code to receive high value data observations and generate data slice rules based on the high value data observations. In some examples, the rule generator module 808 includes code to learn a model that separates in region points from out of region data points. In some examples, the rule generator module 808 includes code to determine whether the points are sufficiently separated. In some examples, the rule generator module 808 includes code to detect a set of most important features in the model. In various examples, the rule generator module 808 includes code to detect important features in the model, and determine minimum and maximum values for the important features. For example, for the most important features, the rule generator module 808 includes code to take minimum and maximum values for continuous features and categories otherwise to generate the data slice rule. In some examples, the rule generator module 808 includes code to validate that applying the data slice rule to the whole data set does not return a subset significantly larger than a region corresponding to the data slice. A data generator module 810 includes code to generate an instance of data based on the generated data slice rule. For example, the data generator module 810 includes code to generate new instances of data using inferred constraints. For example, the data generator module 810 may include code to receive a second data set and generate the instance of data from the second data set using the data slice rule.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

receiving a data set comprising columns and groups;

generating a data slice rule based on a data observation for a data point in the data set, wherein the data observation is calculated by computing a value for each data point in a training set of the data set using a leave-one-out algorithm, and wherein the value indicates an importance of the data point towards a target task through measurement of an effect of omitting the data point from the data set;

partitioning the data points into a first cluster, a second cluster, and a third cluster based on the value, wherein a first threshold separates the first cluster from the second cluster, a second threshold separates the second cluster from the third cluster, and the second threshold is greater than the first threshold;

generating constraints for data points in the third cluster corresponding to the columns and the groups through extraction of characteristics of an empirical distribution; and generating an instance of data based on the generated data slice rule and the generated constraints.

2. The system of claim 1, further comprising:

testing an artificial intelligence model using the generated instance of data.

3. The system of claim 1, wherein the data observation comprises a density based observation.

4. The system of claim 1, wherein the data observation comprises an error concentration based observation.

5. The system of claim 1, wherein the data observation comprises a data value based observation.

6. The system of claim 1, wherein the data observation comprises a received high value data observation.

7. The system of claim 1, wherein the data slice rule is generated by partitioning the training set into a predetermined number of groups based on the computed values, and inferring constraints corresponding to each column and groups of columns in a set of data points of the training set exceeding a threshold.

8. The system of claim 1, wherein the data slice rule is generated by learning a model that separates in region from out of region data points, detecting features in the model, and determining minimum and maximum values for the features.

9. The system of claim 1, further comprising:

receiving a second data set; and generating the instance of data from the second data set using the data slice rule.

10. A computer-implemented method, comprising:

receiving a data set comprising columns and groups;

generating a data slice rule based on a data observation for a data point in the data set, wherein the data observation is calculated by computing a value for each data point in a training set of the data set using a leave-one-out algorithm, and wherein the value indicates an importance of the data point towards a target task through measurement of an effect of omitting the data point from the data set;

partitioning the data points into a first cluster, a second cluster, and a third cluster based on the value, wherein a first threshold separates the first cluster from the second cluster, a second threshold separates the second cluster from the third cluster, and the second threshold is greater than the first threshold;

generating constraints for data points in the third cluster corresponding to the columns and the groups through extraction of characteristics of an empirical distribution; and generating an instance of data based on the generated data slice rule and the generated constraints.

11. The computer-implemented method of claim 10, wherein generating the data slice rule comprises calculating values for data points in the data set using a data valuation algorithm and dividing the data points into groups based on the calculated values.

12. The computer-implemented method of claim 11, further comprising inferring constraints corresponding to each column and groups of columns in a group of data points exceeding a threshold.

13. The computer-implemented method of claim 10, wherein the data set comprises labeled data, further comprising generating the data observation by learning a model that separates in region from out of region data points, and detecting features in the model, and wherein generating the data slice rules comprises determining minimum and maximum values for the features.

14. The computer-implemented method of claim 13, further comprising validating that applying the data slice rule to the data set, as a whole, does not return a subset significantly larger than the region.

15. A computer program product for generating data slice rules, the computer program product comprising a computer-readable storage medium having program code embodied therewith, wherein the computer-readable storage medium is not a transitory signal per se, the program code executable by a processor to cause the processor to:

receive a data set comprising columns and groups;

generate a data slice rule based on a data observation for a data point in the data set, wherein the data observation is calculated by computing a value for each data point in a training set of the data set using a leave-one-out algorithm, and wherein the value indicates an importance of the data point towards a target task through measurement of an effect of omitting the data point from the data set;

partition the data points into a first cluster, a second cluster, and a third cluster based on the value, wherein a first threshold separates the first cluster from the second cluster, a second threshold separates the second cluster from the third cluster, and the second threshold is greater than the first threshold;

generate constraints for data points in the third cluster corresponding to the columns and the groups through extraction of characteristics of an empirical distribution; and generate an instance of data based on the generated data slice rule and the generated constraints.

16. The computer program product of claim 15, further comprising program code executable by the processor to receive a second data set and generate the instance of data from the second data set using the data slice rule.

17. The computer program product of claim 15, further comprising program code executable by the processor to divide the data points into groups based on the calculated values, and infer constraints corresponding to each column and groups of columns in a group of data points exceeding a threshold.

18. The computer program product of claim 15, further comprising program code executable by the processor to learn a model that separates in region from out of region data points, and detect features in the model, and determine minimum and maximum values for the features.

19. The computer program product of claim 15, further comprising program code executable by the processor to validate that applying the data slice rule to the data set, as a whole, does not return a subset significantly larger than a region corresponding to the data slice.

* * * * *